Aug. 6, 1929.　　　　O. J. HUIE　　　　1,723,240

PLATENLESS TYPEWRITER

Filed Jan. 17, 1927　　　6 Sheets-Sheet 1

Inventor
O. J. HUIE
By Cushman, Bryant & Darby
Attorneys

Aug. 6, 1929.  O. J. HUIE  1,723,240
PLATENLESS TYPEWRITER
Filed Jan. 17, 1927  6 Sheets-Sheet 3

Inventor
O. J. HUIE

Aug. 6, 1929.     O. J. HUIE     1,723,240
PLATENLESS TYPEWRITER
Filed Jan. 17, 1927     6 Sheets-Sheet 4

Inventor
O. J. HUIE

Aug. 6, 1929. O. J. HUIE 1,723,240
PLATENLESS TYPEWRITER
Filed Jan. 17, 1927  6 Sheets-Sheet 5

Inventor
O. J. HUIE

Fig. 15.

| Numerical Order of Combinations | Selector Keys + Code for Each Type in Numerical Order |||||||  Type No. | Code in Order of Ease of Manipulation |||||||  Alphabet in Order of Frequent Use | Figures & Characters with Shift Key Down |
|---|---|---|---|---|---|---|---|---|---|---|---|---|---|---|---|---|---|
| | I | III | II | IV | XII | VIII | X | | I | III | II | IV | XII | VIII | X | | |
| 1 |  |  |  |  |  |  |  | 1 |  |  |  |  |  |  |  | E | . |
| 2 | • |  |  |  |  |  |  | 2 | • |  |  |  |  |  |  | O | 9 |
| 3 |  |  | • |  |  |  |  | 4 |  | • |  |  |  |  |  | T | 0 |
| 4 |  | • |  |  |  |  |  | 3 |  |  | • |  |  |  |  | A | 1 |
| 5 |  |  |  | • |  |  |  | 5 |  |  |  | • |  |  |  | I | 2 |
| 6 | • |  |  | • |  |  |  | 13 |  |  |  |  | • |  |  | N | 3 |
| 7 |  |  | • | • |  |  |  | 9 |  |  |  |  |  | • |  | R | 4 |
| 8 |  | • |  | • |  |  |  | 11 |  |  |  |  |  |  | • | S | 5 |
| 9 |  |  |  |  | • |  |  | 7 |  |  | • | • |  |  |  | L | 6 |
| 10 | • |  |  |  | • |  |  | 8 |  | • |  | • |  |  |  | C | 7 |
| 11 |  |  |  |  |  |  | • | 16 |  |  | • |  | • |  |  | H | 8 |
| 12 | • |  |  |  |  |  | • | 6 | • |  |  |  | • |  |  | D | 9 |
| 13 |  |  |  | • |  |  |  | 19 |  |  |  |  |  | • | • | M | : |
| 14 | • |  |  | • |  |  |  | 23 |  |  |  |  | • |  | • | U | ; |
| 15 |  |  | • |  |  |  | • | 15 |  |  |  |  | • |  | • | P | ( |
| 16 |  | • |  | • |  |  |  | 10 | • |  |  |  |  | • |  | F | ) |
| 17 |  |  | • | • |  |  | • | 14 | • |  |  |  | • |  |  | W | $ |
| 18 |  |  |  | • |  |  | • | 12 | • |  |  |  |  |  | • | G | ¢ |
| 19 |  |  |  |  | • | • |  | 17 |  |  | • | • |  |  | • | B | / |
| 20 | • |  |  |  | • | • |  | 18 |  | • |  | • |  |  | • | Y | — |
| 21 |  |  | • |  | • |  | • | 20 | • |  |  | • |  |  | • | V | ǀ |
| 22 |  | • |  |  | • |  | • | 21 |  |  | • |  |  | • | • | K | + |
| 23 |  |  |  | • | • |  | • | 22 |  | • |  |  |  | • | • | J | ∧ |
| 24 | • |  |  | • | • |  | • | 24 | • |  |  |  | • |  | • | Q | ? |
| 25 |  |  | • | • | • |  | • | 25 |  |  | • |  | • |  | • | X | ℔ |
| 26 |  | • |  | • | • |  | • | 26 |  | • |  |  | • |  | • | Z | = |

Inventor
O. J. HUIE

By Cushman Bryant Darby
Attorneys

Patented Aug. 6, 1929.

1,723,240

UNITED STATES PATENT OFFICE.

OLIVER J. HUIE, OF ATLANTA, GEORGIA.

PLATENLESS TYPEWRITER.

Application filed January 17, 1927. Serial No. 161,674.

The present invention has particular reference to a portable platenless typewriter adapted to be supported directly on a printing surface to print thereon, the typewriter being provided with means to exert tractive effort on the surface to move the device thereacross in printing direction. The device will thus be particularly adapted to printing in books and the like, which cannot be handled by the ordinary typewriter.

Such a device must be much smaller in size than the ordinary typewriter, in order to be readily manipulated in the manner mentioned, and it is the especial object of this invention to provide an extremely compact machine which shall at the same time be entirely accurate in operation. Compactness is obtained principally by the use of a code system, which permits a great reduction in the number of keys required, and in the embodiment of my invention which I shall describe hereinafter, only seven main keys and two auxiliary keys are required to carry out all the operations of the machine. These keys are so arranged as to be easily operated by a single hand, all the selective keys being operable to make any selection within the scope of the machine by the use of four fingers of one hand, while the printing key arranged on the opposite side of the keyboard from the selective keys may be manipulated by the thumb.

The embodiment of the invention which I have illustrated in the accompanying drawings, and which I shall describe hereinafter is suggestive rather than restrictive of the invention, since many optional rearrangements of the basic instrumentalities would readily occur to those skilled in the art.

*Code system and arrangement of selector keys.*

In the invention as illustrated, I have assumed fifty-two to be the desired number of type, twenty-six being allotted to the alphabet, and the remaining twenty-six representing figures from 0 to 9, punctuation marks and other desired characters.

In the embodiment of the invention to be presently described, the type bars are arranged around the periphery of a revoluble type wheel, and hence, assuming one type bar to be always in operative position, it is necessary that the type wheel be selectively rotatable to any one of fifty-one other positions in order that the type bars may be brought selectively into operative position, that is, in position to be struck by the single hammer, fixed in relation to the machine, which is provided. As the type bars are arranged entirely around the periphery of the type wheel at equal distances from each other, it is thus required to be rotated through any required angle, as determined by the type bar spacing, in order to bring one of the latter into typing position. To accomplish this, I have provided six keys which are manipulatable separately or together to impart such individual or aggregative movements to the type wheel.

Figure 2:
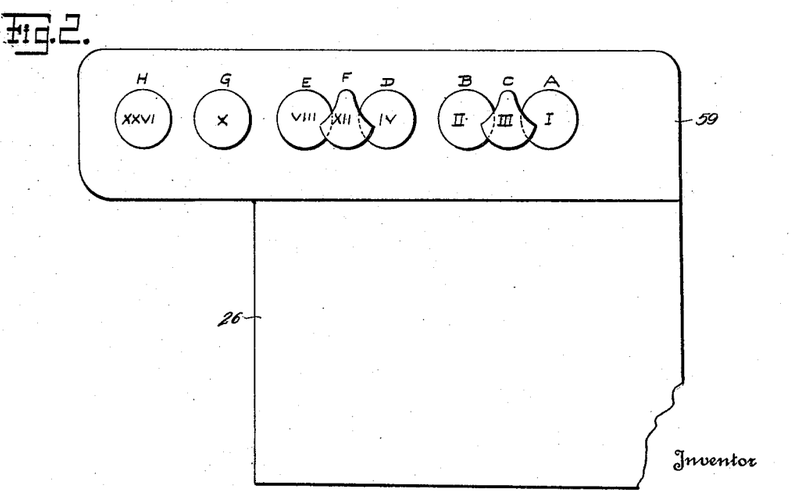
Figure 2 is a side elevation of the device as seen from the right.
Figures 3, 4, 16:
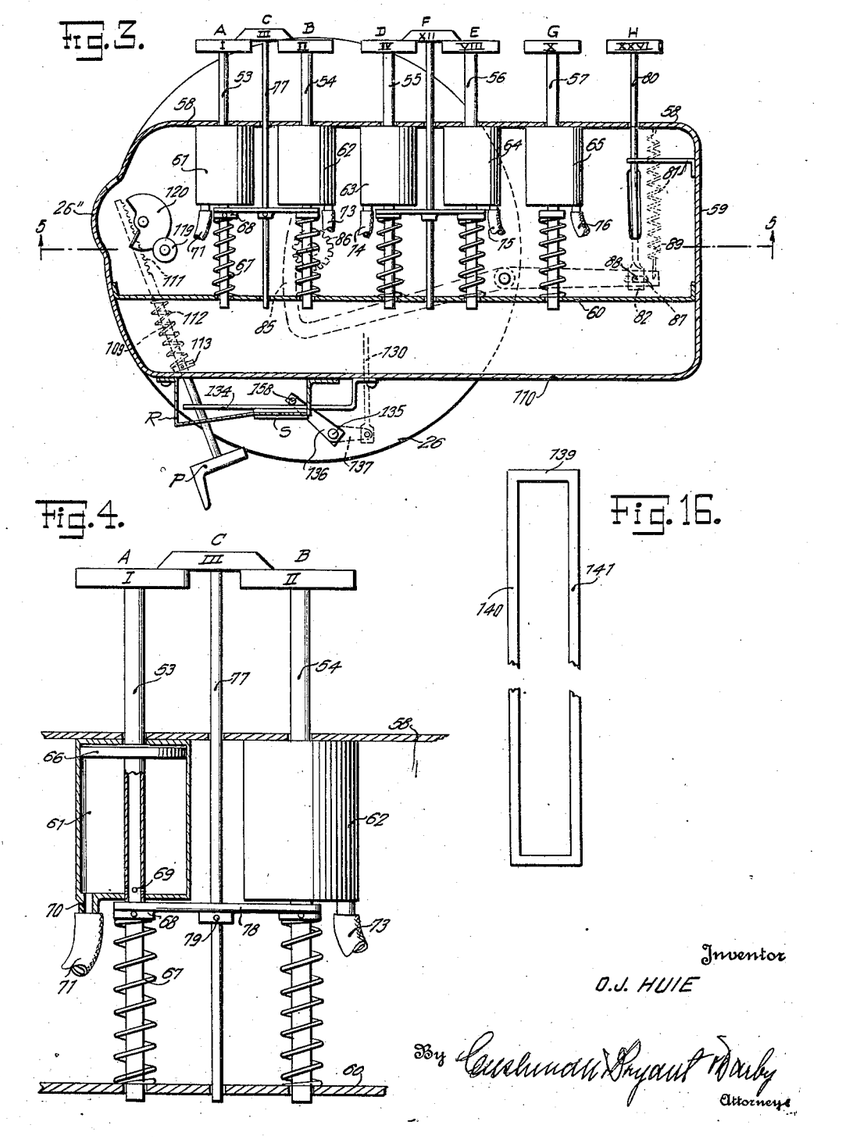
Figure 3 is a section on the line 3—3 of Figure 1.
Figure 4 is an enlargement partly in section of elements shown in Figure 3.
Figure 16 shows a guide device for insuring rectilinear travel of the machine.

As shown in Figures 2 and 3 in particular, these keys are indicated by the letters A, B, D, E, G and H, and have respective values of 1, 2, 4, 8, 10 and 26. The depression of key A causes, through suitable transmission means, the rotation of the type wheel through one angular unit, so as to bring the second type bar into position, while the other keys when depressed independently cause the type wheel to rotate through the corresponding number of angular units. If, however, keys one and four, for instance, are simultaneously depressed, the effect upon the type wheel is aggregative and it is advanced through five angular units to bring the sixth type bar into typing position. It will be seen that by proper manipulation of keys A, B, D, E and G, the type bar may be advanced through any selected number of angular units up to twenty-five, this latter figure being the sum of the values of all of these keys. Including the first type bar which is normally in the printing place, twenty-six selections have thus been provided. The key H is in itself capable upon manipulation of rotating the type wheel through 180° or twenty-six angular units, and by the depression of this key, the twenty-seventh type bar is brought into printing place. Thus if it is desired to print the character carried by the thirtieth type bar, for instance, key H and keys A and B will be depressed. To facilitate the simultaneous manipulation of keys A and B, an overlapping key C is provided, and upon its depression, it will carry keys A and B with it. A similar auxiliary key F is provided for keys D and E.

Figure 15:
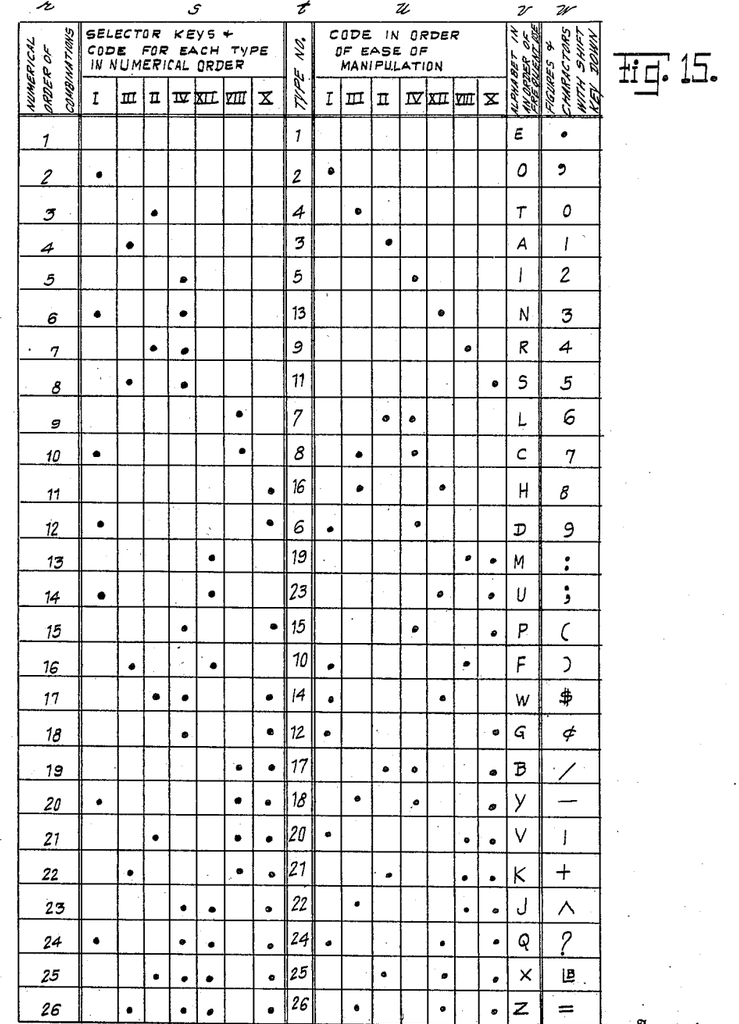
Figure 15 is a chart showing code systems upon which the machine of the present invention may operate.

Referring to the chart, shown in Figure 15, column $s$ indicates the key or combination of keys to be used to obtain the code position indicated in column $r$, it being understood, as explained above, that the number one position is the normal rest position of the machine. Column $v$ indicates the manner in which the letters of the alphabet may be allotted to the code position, while column $w$ indicates the figure or character which would be printed upon the depression of key H and manipulation of keys A, B, D, E and G. To print a period accordingly, it will be necessary first of all to depress key H, whereby the type wheel is rotated through twenty-six units and brought to the twenty-seventh position. Thus to use the machine, it is first of all necessary that the operator memorize the code positions corresponding to the letters of the alphabet, the figures and the characters. Columns $t$ and $u$ merely show a rearrangement of the code positions to bring about ease of manipulation.

The broad idea of the invention is not confined to the use of the key values discussed above; for example, I might give the keys the values of 1, 2, 4, 8, 16 and 32, and thus obtain sixty-four selective positions. Again I might provide a second key having the value thirty-two and thus secure ninety-six positions, or I might continue the geometric progression of values indefinitely. Since six is the most convenient number of keys, however, and fifty-two positions fully adequate for general purposes, I prefer to use the system which has been described above.

*Selector mechanism.*

Figure 1:
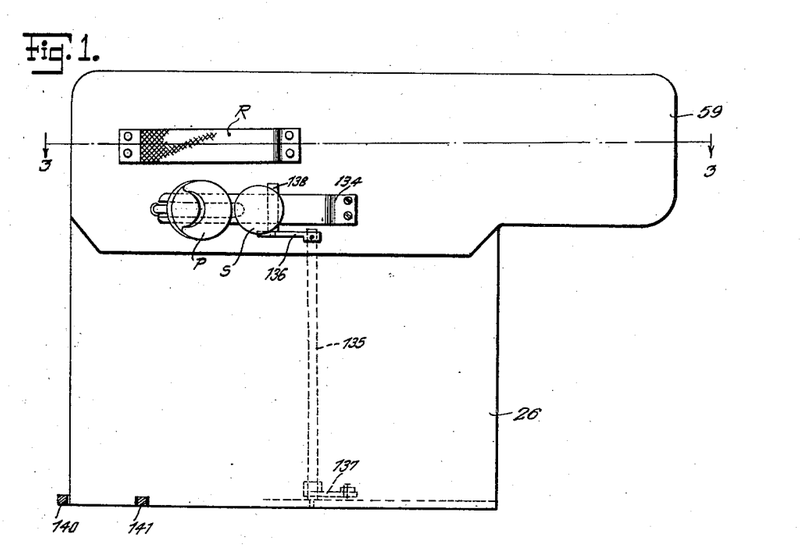
Figure 1 is a side elevation of the device as seen from the left.

As shown in Figs 1, 2 and 3, the machine has a casing consisting of a lower substantially cylindrical portion and an upper horizontally extending box-like portion. The type wheel and the actuating units therefor are positioned in the lower cylindrical portion, while the selector keys are carried by stems horizontally arranged in the box portion. The type carrier or wheel consists of a circular disc 20 supported on a vertical axial shaft 21 rotatably supported in a foot bearing 22 on the base plate 23 of the casing. The upper reduced end 24 of shaft 21 extends through a suitable aperture in a partition wall 25 at the upper end of the cylindrical portion 26. The spring 27 having its ends fixed to shaft 21 and bearing 22, tends to turn the former in the direction of arrow $x$, Fig. 13. This tendency is likewise exerted upon disc 22 which is fixed to shaft 21 by pin 28. An annular member 29 having upper and lower flanges 30 and 31 is riveted through the former to disc 20 in concentric relation therewith. The peripheries of disc 20 and flange 31 are provided with vertically aligned apertures, fifty-two in each, and fifty-two type bars 32 are supported in these apertures for vertical sliding movement. Each type bar is provided with a stop pin 33, and between this pin and flange 31 is a compression spring 33 normally forcing the pin into contact with disc 20.

Five horizontally extending brackets 34 to 38 inclusive are rotatably supported above disc 20 in superposed position on shaft 21. Bracket 34 supports a cylinder 39 in horizontal position and concentrically with shaft 21, Fig. 13. A piston rod 40 likewise concentric with shaft 21, has a piston head 41 and an expanded extremity 42 which is fixed to an upward extension 35' of bracket 35. The cylinders 43, 44 and 45 are similarly interconnected by means of the corresponding brackets, while the piston rod 47 of cylinder 46 is fixed to an abutment 48 carried on the top of disc 21.

Figures 12, 13, 14, 17:
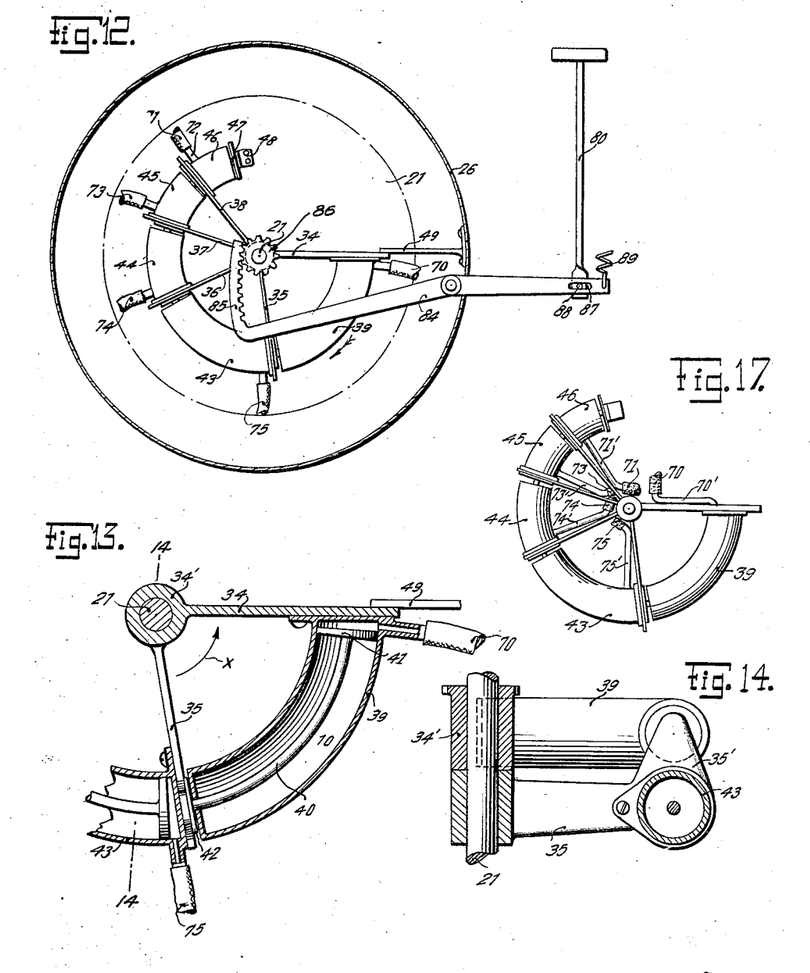
Figure 12 is a view in part of the main body of the device with the top removed.
Figure 13 is an enlarged view of a portion of Figure 12.
Figure 14 is a section on the line 14—14 of Figure 13.
Figure 17 is a plan view of a portion of the selector mechanism showing alternative arrangements of the part.

Due to the action of spring 27 in its tendency to rotate disc 21 in the direction of arrow $x$, Fig. 13, there is a tendency to swing all the brackets and cylinders in the same direction, thus bringing each bracket into abutment with the end of the cylinder in which its attached piston rod works. This rotative tendency is limited by an abutment 49 which is fixed to casing 26 and arrests the type wheel in such position as to normally hold the machine in the number one position, in which the type bar corresponding to this position is stationed exactly beneath hammer 50. This latter is vertically slidable in perforations in partition 25, and a flange 51 supported by casing 26. A compression spring 52 abuts with its respective ends a collar fixed on shaft 50, and bracket 51, Fig. 5, and thus tends to impart downward movement to the hammer. The means for controlling the hammer will be described hereinafter.

Keys A, B, D, E and G are provided with stems 53 to 57, which extend through aligned apertures in wall 58 of the upper casing member 59 and a partition wall 60. These stems are preferably hollow, their outer ends being stopped by the attached keys.

Referring particularly to Fig. 4, it will be seen that a closed cylinder 61 is fixed to wall 58 concentrically with shaft 53. Stems 54 to 57 are similarly provided with cylinders 62 to 65, so that the description of one will apply to all. A piston 66 is fixed to stem 53 within cylinder 61 and is normally maintained in the position shown in Fig. 4 by means of a compression spring 67 interposed between wall 60 and a washer 68 fixed to the stem, which latter is provided with perforations 69 just within cylinder 61. Cylinder 61 has an outlet nozzle 70 connected by means of a flexible tube, preferably of rubber, with inlet nozzle 72 of cylinder 46. Upon depression of key A therefor, air pressure will be developed in cylinder 61 and transferred through tube 71 to cylinder 46 in front of the piston within the latter. The length of piston rod 47 is such that upon its movement, as above described, it will rotate the type wheel through a single unit, this being the value of key A. The movement of the piston rod is limited by the abutment of its connected piston against the end wall of the cylinder. Cylinder 62 is in connection with cylinder 45 by means of a tube 73, and since key B has the value of two, upon its depression, the piston rod of cylinder 45 working against bracket 38 will rotate the type wheel through two angular units. Supposing key A to have been depressed and held depressed, if key B is manipulated, bracket 38 and cylinder 46 will be rotated through two angular units, and this plus the unit through which the type wheel has already been advanced by the action of piston rod 47 upon abutment 48, will advance the type wheel to the fourth position. Cylinders 63, 64 and 65 are in connection with cylinders 44, 43 and 39 by means of tubes 74, 75 and 76, these latter cylinders being so proportioned as to be able upon actuation of keys D, E and G to advance the type wheel through four, eight and ten angular units respectively. As mentioned above, the motive effect of any one of the cylinders may be transmitted individually to the type wheel or aggregated with any or all of the others, so that by suitable manipulation, the type wheel may be advanced through any number of angular movements from one to twenty-five.

Key C which overlaps slightly keys A and B is provided with a stem 77 passing through aligned apertures in walls 58 and 60. A cross member 78 fixed to shaft 77 by pin 79 has bifurcated ends extending between the spring abutting washers of stems 53 and 54 and cylinders 61 and 62. Thus upon depression of key C, cross member 78 will carry stems 53 and 54 with it causing the simultaneous expansion of actuators 45 and 46. Cross member 78 is provided to prevent the distorting effect which key C, due to its disposition, would otherwise have on keys A and B. Key F bears the same relation to keys D and E as that above described.

Cylinders 61 to 65 have a considerably larger capacity than their respective actuator cylinders so that a complete expansion of the latter is always assured upon depression of the selector keys. The perforations at 69, Fig. 4, are provided in the key stems, so that the cylinders will be placed in communication with the atmosphere upon the piston return, so that a state of vacuum cannot be retained in the cylinders under any circumstances. Due to the position of these apertures, as shown, such communication will be cut off immediately upon depression of the keys.

As has been described above, a key H is provided which by a single manipulation is adapted to rotate the type wheel through twenty-six angular units or through 180°. This key has a stem 80 passing through aligned apertures in wall 58 and a bracket 81, and the rear portion of this key is bent downwardly to bring its extremity 82, Figs. 3 and 5, below partition 25. A vertical shaft 83 rotatably journaled in base plate 23 and wall 25 has fixed to it a two arm lever 84, provided at its left end with a toothed segment 85 engaging a pinion 86, fixed to the hub 34' of bracket 34. The right end of lever 84 is provided with a slot 87 engaged by a pin 88 carried at the extremity of stem 80, see Figs. 3, 5 and 12. A spring 89 tends to hold stem 80 in the position illustrated, the influence of the spring being limited by the abutment of bracket 34 against stop 49. The stroke of stem 80 is so determined that the resultant movement of segment 85 will rotate pinion 86, and therewith the type wheel through twenty-six angular units.

While the tube connections as above described in connection with Fig. 12 are quite practicable, I have illustrated preferred arrangements in Fig. 17. It will be noted that according to this figure, the inlet nipple 70' projects through bracket 34, and communicates at its outer end with the interior of cylinder 39, while the inner end of the nipple lies in close proximity to the axis of rotation of the cylinder. In this manner, the necessary length of tube 70 is greatly reduced. A further modification is shown in connection with cylinder 43, according to which a nipple 75' is let through the cylinder wall near the base of the cylinder and is carried along bracket 35, its inner end lying, as above, immediately adjacent the axis of rotation. Flexible tube 75, is in connection with the inner end of this tube or nipple. This same arrangement has been shown in connection with cylinders 44, 45 and 46, each being provided with an inwardly extending nipple 74', 73' and 71' respectively.

Inking mechanism.

Figure 5:
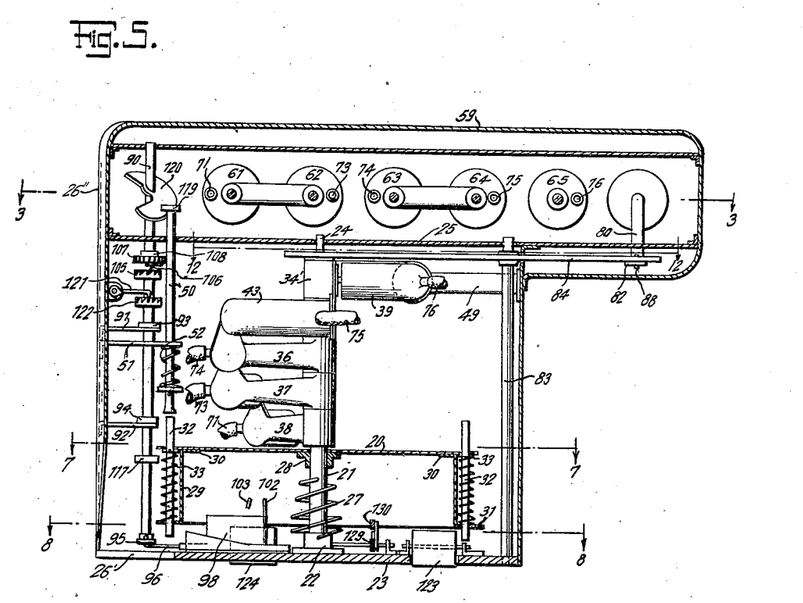
Figure 5 is a section on the line 5—5 of Figure 3.
Figures 8, 9, 10, 11:
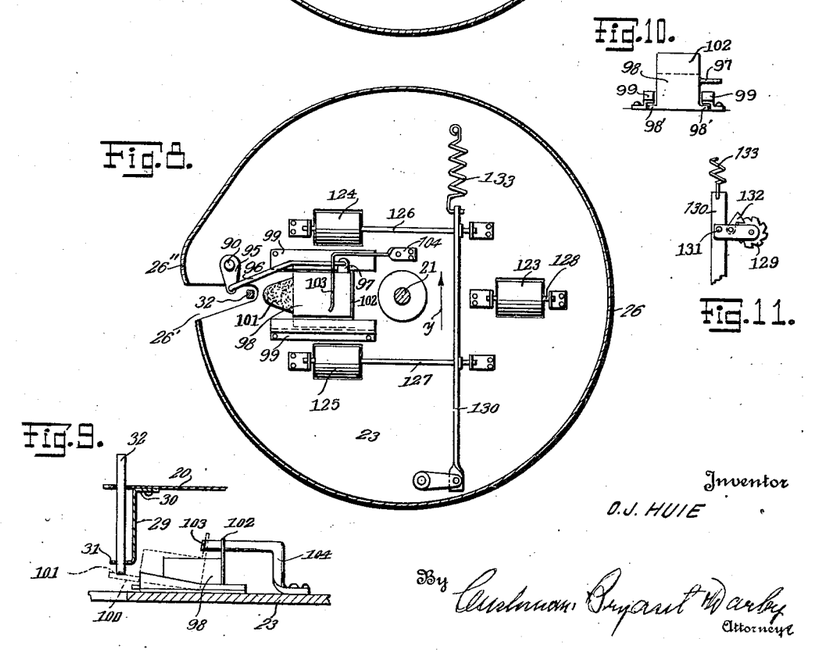
Figure 8 is a section on the line 8—8 of Figure 5.
Figure 9 is an enlarged view of the printing mechanism.
Figure 10 is a view of the inking block of Figure 9, as seen from the right of that figure.
Figure 11 is a detail of the propelling mechanism.

The cylindrical portion 26 of the machine casing is provided with a cut away portion 26' in the number one or printing position, and adjacent this point the casing is given a longitudinal outward bulge 26'' to permit unobstructed movement of shaft 90 and its associated instrumentalities, see Figs. 5 and 8 in particular. Shaft 90 is vertically and rotatably supported in aligned apertures in brackets 91, 92 and partition 25, and is restrained against the force of gravity by fixed collars 93 and 94. A crank arm 95 is rigidly secured to the lower end of shaft 90 and this arm is pivoted by means of a link 96 with a lug 97 at the top rear of a block 98. Block 98 is provided with lateral lugs 98' engaged by guide rails 99 secured to plate 23. The block is provided with a forward extension 100 which supports an inking pad 101. Thus, by rotation of shaft 90 reciprocating movements may be imparted to the inking block, and at one extremity of its travel, pad 101 will be brought beneath the type bar which is in the printing position. Block 98 has an upward projection 102 at its upper rear and this projection during the forward travel of the block comes in contact with an abutment rail 103 supported on a bracket 104 fixed to plate 23. The continued forward movement of the block therefor causes it to tilt, bringing pad 101 into contact with the type to be inked. It will be noted that a 180° rotation of shaft 90 will cause the inking of the type and the return to inoperative position of the inking block.

At its upper end, shaft 90 is provided with a rigidly attached ratchet wheel 105 engageable by a pawl 106, arranged at the bottom of a pinion 107 rotatable on a hub 108 which is fixed to shaft 90. Hub 108 has flanges at either side of pinion 107 so the vertical displacement of the latter is impossible. A printing key P has a stem 109 disposed in appropriate apertures in walls 110 and 60 of the upper casing, this stem being preferably polygonal in cross section, and the apertures being of corresponding configuration in order to prevent rotative movement of the stem. At its inner end, stem 109 is provided with teeth 111, which engage pinion 107. A spring 112 working against pin 113 serves to hold key P yieldably in the position shown in Figure 3, and the stroke of stem 109 is so regulated as to be adapted to cause a 360° rotation of pinion 107, and therewith shaft 90 through the intermediary of pawl 106 and ratchet wheel 105. Thus it will be seen that a half stroke of stem 109 will suffice to operate the printing block and withdraw it into inoperative position.

Locking mechanism.

Figure 7:
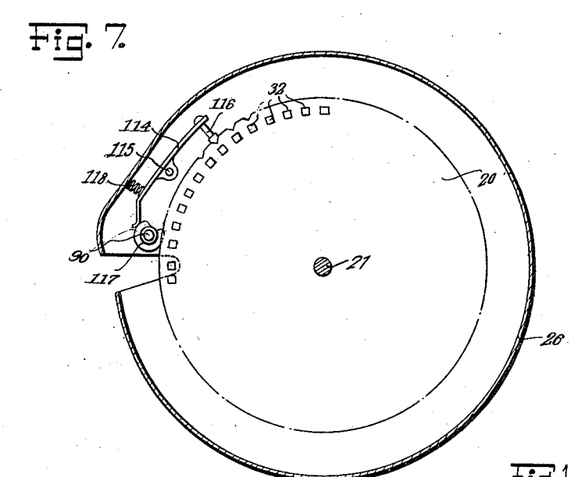
Figure 7 is a section on the line 7—7 of Figure 5.

As particularly illustrated in Fig. 7, the periphery of disc 20 is notched on a radial line with each of the type bars, and a lever 114 pivotally supported on the stud 115 suitably secured to the machine frame had at its one end a pawl 116 adapted to engage the notches. A cam 117 fixed to shaft 90 engages the tail of lever 114 directly upon depression of key P and moves it against the action of spring 118, so that pawl 116 engages the notch of disc 20 which is adjacent it. Cam 117 is so shaped as to release lever 114 only after the entire printing operation has been completed.

Hammer control.

Hammer 50 has at its upper end a head 119 engageable by a helicoidal segment 120 rigidly secured to shaft 90. In the rest position of the machine, head 119 is engaged by segment 120, so that the hammer is lifted clear of the type bar therebeneath. Upon depression of key P, and consequent rotation of shaft 90 and the segment, head 119 will ride along the latter through the first 180°, that is, until the inking block has performed its function and been removed to inoperative position. The hammer which has been raised further during this rotation, now slides off the upper end of the segment and is brought sharply against the positioned type bar under the influence of spring 52. Upon further rotation of shaft 90, the lower edge of segment 120 will engage under the head 119 and lift the hammer clear of the type bar. Thus after 360° rotation, the parts will again assume the position illustrated. Head 119, due to the influence of spring 52, has the tendency to impart counter rotation to the segment and to shaft 90. Such rotation is prevented by a pawl 121 operatively pivoted to the machine frame, which engages a ratchet wheel 122 fixed to shaft 90.

*Mechanism for advancing machine.*

Figure 6:
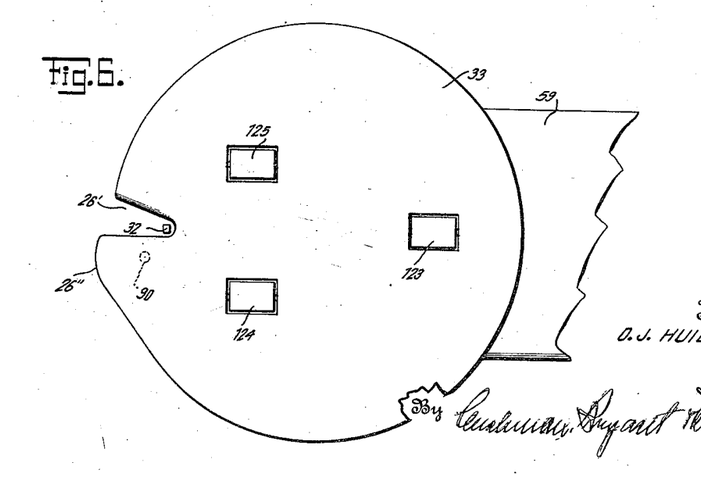
Figure 6 is a plan view of the machine as seen from below.

As shown particularly in Figs. 5, 6 and 8, three rollers 123, 124 and 125 project downwardly through perforations in base plate 23 to form a three point suspension for the machine. Rollers 124 and 125 have extended shafts 126 and 127 journaled in suitable brackets secured to plate 23, while roller 123 is provided with an axial shaft 128 only sufficiently long to engage its similar supporting brackets. Shafts 126 and 127 each have secured thereto a ratchet wheel 129, Fig. 11, and a bar 130 extends transversely to shafts 126 and 127 above the wheels 129. Bar 130 is connected to shafts 126 and 127 by pivotal links 131, and links 131 carry pivoted pawls 132 adapted to engage ratchets 129 to rotate them in a clockwise direction. A tension spring 133 exerts its influence on bar 130.

Referring to Figs. 1 and 3, it will be observed that a spring arm 134 is suitably fixed to the machine casing at one end, so that its free end clears the frame by some distance. The free end of arm 134 is bifurcated to extend to either side of the stem 109. A key S is fixed to the intermediate portion of arm 134 and through the connections to be described acts as spacing key upon manipulation.

A vertical shaft 135 is suitably journaled in the machine frame for rotation, and this shaft has affixed to its upper end an angular arm 136, and at its lower end an angular arm 137. Arm 136 carries a vertical pin 138 in contact with the rear surface of spring arm 134, while arm 137 is connected through a suitable pin and slot connection with bar 130. Upon depression of key S therefor, bar 130 will be drawn outwardly, and upon release of this key, bar 130 will be returned under the influence of spring 133, pawls 132 engaging ratchets 129, so that rollers 124 and 125 are given rotative movements and the machine is advanced a step in the direction of the arrow *y*.

Similarly, key P will engage the arm 134 during the latter portion of its movement, so as to actuate the advancing mechanism.

*General operation.*

From the above description, it will be seen that in operation the machine is placed upon the printing surface in such position that the arrow *y*, Fig. 8, points in the advance direction. In order to insure rectilinear travel of the machine, I may provide a guide frame 139, such as shown in Fig. 16, which is placed on the printing surface to extend in the direction of the machine advance. Rail 140 of the guide frame is adapted to abut casing 26 at its lower edge, while plate 23 and the lower extremities of casing 26 are grooved to receive rail 141.

Having suitably positioned the machine, the type wheel is set in a manner which has already been described, and thereupon key P is depressed. As above described, the depression of this single key causes the locking of the type wheel, the inking of the type and the operation of the hammer, while upon the release of key P the machine is advanced bodily by one space. If it is desired to advance the machine by a space without printing, key S is, of course, depressed.

In Figs. 1 and 3, I have shown a fixed thumb rest R, positioned directly above keys P and S. The purpose of this rest is to balance the pressure of fingers on the selector keys. In use, the ball of the thumb will ride on this rest and keys P and S will be operated by an inward thrust of the tip of the thumb.

From the above, it will be seen that I have provided an extremely compact machine of the least possible complication consistent with its manifold functions. While I have mentioned above that the machine according to this invention is particularly adapted to writing on book surfaces and the like, it is of course obvious that its use also extends to marking shipping boxes and the like, where heretofore stencils or pot and brush have been used. In the larger sizes of the machine for use in the instance last mentioned, the type face will preferably be of rubber. In the structure as specifically described hereinbefore the type face will preferably be of metal.

While I have necessarily described a particular embodiment of my invention, it is to be understood that the scope thereof is to be determined in accordance with the following claims. According to the modification which has been described, pressure upon the selector keys serves to generate fluid pressure for the actuation of the expanders. However, without departing from the spirit of my invention, the selector keys might control valves to admit pressure from an external source to the expanders.

I claim—

1. In a typewriter, a rotatable type carrier, a plurality of keys in connection with said carrier, means actuated by said keys to impart individual and aggregative selective angular movements to said carrier, and means operable to cause simultaneous actuation of said keys.

2. In a typewriter, a rotatable type carrier, a plurality of keys in connection with said carrier, means actuated by said keys to impart differential angular movements to said carrier, and means operable to cause simultaneous actuation of said keys.

3. In a typewriter, a movable type carrier, a plurality of keys, fluid pressure generating means operated upon manipulation of said keys, differentially movable actuators in connection with said pressure generating means and operable thereby, and transmission means between said actuators and said type carrier.

4. In a typewriter, a rotatable type carrier, a plurality of keys, fluid pressure generating means operated upon manipulation of said keys, a plurality of differently expansible units in connection with said pressure generating means and arranged concentric with the axis of rotation of said type carrier, and transmission means between said expansible units and said type carrier.

5. In a typewriter, a rotatable type carrier, a vertical shaft for supporting said type carrier, a plurality of keys, fluid pressure generating means operated upon manipulation of said keys, a plurality of differently expansible units in connection with said pressure generating means and superposed on said shaft in concentric relation thereto, and transmission means between said expansible units and said type carrier.

6. In a typewriter, a rotatable type carrier, a vertical shaft supporting said type carrier, a plurality of angularly movable cylinders superposed on said shaft in concentric relation thereto, pistons in said cylinders in connection with adjacent cylinders, the piston of one of said cylinders being in connection with said type carrier, a plurality of keys, and pressure generating means operated upon manipulation of said keys and in connection with said cylinders, whereby the movements of said pistons are transmittible separately or aggregatively to said type carrier.

7. In a typewriter, a rotatable type carrier, means normally holding said type carrier yieldably in a predetermined position, selective means operable to impart differential angular movements by predetermined units to said type carrier up to 180° minus one angular unit, and a further single means adapted to impart an angular movement of 180° to said type carrier.

8. In a typewriter, a rotatable type carrier, a vertical shaft for supporting said type carrier, superposed brackets on said shaft and independently rotatable relative to each other, means for imparting differential angular movements to said brackets, and connections between said brackets and said type carrier whereby independent or aggregative movements of the former may be transmitted to the latter.

9. In a typewriter, a rotatable type carrier, a vertical shaft for supporting said type carrier, superposed brackets on said shaft and independently rotatable relative to each other, means for imparting differential angular movements to said brackets, connections between said brackets and said type carrier whereby independent or aggregative movements of the former may be transmitted by predetermined angular units to the latter, the aggregative movements of said brackets being capable of rotating said type carrier through 180° minus one angular unit, and a further single means in connection with said type carrier adapted to rotate the latter through 180°.

10. In a typewriter adapted to rest in operative position directly upon a printing surface, a rotatable type carrier, type bars slidably supported by said type carrier for movement in the axial direction of the latter, a hammer, means for bringing a selected type carrier in operative position relative to said hammer, a printing key for controlling said hammer, inking means operated by said printing key, and means operated by said printing key for locking said type carrier in position during the printing action, and means controlled by said printing key to bodily advance the machine over said surface.

11. In a typewriter, a type bar, a hammer in operative relation relative to said bar, spring means forcing said hammer toward said bar, a helicoidal segment engaging said hammer, and means for rotating said segment in engagement with and past said hammer for lifting and releasing the same to permit its impact on said type bar under the action of said spring.

12. In a typewriter, a type bar, a hammer in operative position relative to said type bar, a spring forcing said hammer toward said type bar, a helicoidal segment engaging said hammer, and means for rotating said segment relative to said hammer to move the latter against the action of said spring, release it for impact against said type bar, and again engage it to return it to inoperative position.

13. In a typewriter, a type bar, a hammer in operative position relative to said type bar, a spring forcing said hammer toward said type bar, a helicoidal segment engaging said hammer, means for rotating said segment relative to said hammer to move the latter against the action of said spring, release it for impact against said type bar, and again engage it to return it to inoperative position, and detent means for holding said hammer in its inactive position.

14. In a typewriter, a vertical type bar, an inking pad, said pad having a projection at its upper rear portion, an abutment, and means for moving said pad toward said type bar to cause the engagement of said projection with said abutment whereby the pad is tilted into contact with the type.

15. In a typewriter, rotatable supporting means for the typewriter, a type bar, a hammer in operative relation thereto, an inking device, and common operating means for actuating said inking device to ink the type, raising and releasing the hammer for impact against said type bar, and controlling the rotative movement of said rotatable supporting means.

16. In a typewriter, a key board having selector keys arranged along one side thereof and manipulatable by the four fingers of one hand, horizontally reciprocable stems supporting said keys, a printing key arranged on the opposite side for manipulation by the thumb of the same hand, and a horizontally reciprocable stem for said printing key.

17. In a typewriter, a key board having a series of five selector keys having differential values, said keys being manipulatable singly by the three fingers of one hand to set up values dependent upon the individual key values, and bridging means whereby the keys may be operated simultaneously by the three fingers of one hand to set up the total of their values.

18. In a typewriter, a key board having a series of five primary selector keys having differential selective values, said keys being manipulatable singly by the three fingers of one hand to set up values dependent upon the individual key values, bridging means whereby the keys may be operated simultaneously by the three fingers of one hand to set up the total of their values, and a secondary selector key having a value larger by a unit than the total value of the primary keys.

19. In a typewriter, a key board having a series of five primary selector keys having values of one, two, four, eight and ten, said keys being manipulatable singly, to set up values dependent upon the individual key values, bridging means for some of the adjacent keys whereby the latter are simultaneously operable to set up the total of their values, and a secondary selector key having the value twenty six.

20. In a typewriter, a rotatable type carrier, means normally holding said type carrier in a predetermined position, motive means singly and aggregatively operable to impart differential angular movements by unit steps to said type carrier up to 180° minus one angular unit, said motive means being rotatable as a whole about the axis of said type carrier, and means adapted to impart a rotative movement of 180° to said motive means as a whole and therewith to said type carrier.

In testimony whereof I have hereunto set my hand.

OLIVER J. HUIE.